United States Patent
Ekambaram et al.

(10) Patent No.: US 9,760,476 B2
(45) Date of Patent: Sep. 12, 2017

(54) CROWDSOURCED DEVICE CLOUD FOR APPLICATION TESTING

(71) Applicant: International Business Machines Corporation, Armonk, NY (US)

(72) Inventors: Vijay Ekambaram, Chennai (IN); Ashish Kumar Mathur, Bangalore (IN); Nitendra Rajput, Gurgaon (IN); Vivek Sharma, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/885,310

(22) Filed: Oct. 16, 2015

(65) Prior Publication Data
US 2017/0109270 A1    Apr. 20, 2017

(51) Int. Cl.
G06F 9/44    (2006.01)
G06F 11/36    (2006.01)
H04L 29/08    (2006.01)

(52) U.S. Cl.
CPC ............ G06F 11/3688 (2013.01); G06F 8/70 (2013.01); H04L 67/02 (2013.01)

(58) Field of Classification Search
CPC ......... G06F 8/70; G06F 11/3688; H04L 67/02
USPC ................................................ 717/124–133
See application file for complete search history.

(56) References Cited

U.S. PATENT DOCUMENTS

| | | | |
|---|---|---|---|
| 8,510,386 B2 * | 8/2013 | Fahmy | H04L 51/28 709/206 |
| 8,856,748 B1 | 10/2014 | Larsen et al. | |
| 9,015,654 B2 | 4/2015 | Kaasila et al. | |
| 9,262,306 B2 * | 2/2016 | Balestrieri | G06F 11/3672 |
| 9,264,497 B2 * | 2/2016 | Jambunathan | H04L 67/141 713/150 |
| 9,383,976 B1 * | 7/2016 | Singh | G06F 8/34 717/103 |

(Continued)

FOREIGN PATENT DOCUMENTS

FR    EP 2348477 A1 *    7/2011    ............ G06Q 30/02

OTHER PUBLICATIONS

Daniel Dem, "Testing Apps for SmartPhones and Mobile Devices (Without Buying Out the Store)", Mar. 2011, retrieved from http://blog.smartbear.com/mobile/testingappsforsmartphonesandmobiledeviceswithoutbuyingoutthestore/, 8 pages.*

(Continued)

*Primary Examiner* — Ted T Vo
(74) *Attorney, Agent, or Firm* — Ference & Associates LLC

(57) ABSTRACT

Methods and arrangements for a method of managing crowdsourced devices for application testing, said method comprising: utilizing at least one processor to execute computer code that performs the steps of: receiving, from a mobile device, a request to register itself as a rentable device; receiving, from a remote device, a request to test an application; transmitting, to the remote device, a list of rentable devices available; receiving a selection, from the remote device, of at least one rentable device for testing; and responsive to receiving the selection, transmitting instructions to the at least one rentable device to execute the instructions, the instructions comprising at least one test step for an application. Other variants and embodiments are broadly contemplated herein.

20 Claims, 5 Drawing Sheets

(56) References Cited

U.S. PATENT DOCUMENTS

2014/0372160 A1* 12/2014 Nath ............... G06Q 10/06311
  705/7.13
2015/0180979 A1  6/2015 Jambunathan et al.
2016/0080477 A1* 3/2016 Nedeltchev ............ H04L 67/02
  709/226

OTHER PUBLICATIONS

Starov, Oleksii et al., "Cloud Testing for Mobile Software Systems Concept and Prototyping", ICSOFT 2013, 8th International Joint Conference on Software Technologies, Reykjavik, Iceland, Jul. 29-31, 2013, 8 pages, East Carolina University, Greenville, North Carolina.
Testdroid Website, http://testdroid.com/, 3 pages, Accessed on Sep. 2, 2015.
Soasta Website, http://www.soasta.com/touchtest/, 7 pages, Accessed on Sep. 2, 2015.
Xamarin Website, http://xamarin.com/test-cloud, 9 pages, Accessed on Sep. 2, 2015.
UTEST Website, http://www.utest.com/, 4 pages, Accessed on Sep. 2, 2015.

* cited by examiner

CROWDSOURCED DEVICE CLOUD FOR APPLICATION TESTING

BACKGROUND

Mobile devices, for example cell phones, smart phones, tablet devices, and the like permit users the ability to utilize applications (apps) in order to carry out a variety of tasks. Applications have become vital to our ability to use mobile devices, so much so that each of the major app stores currently contain over 1.5 million applications. However, application designers are facing an ever growing ecosystem of devices. Not only are there multiple operating systems, but many operating systems have a variety of versions concurrently in operation. Additionally, the number of hardware device manufacturers appears to be growing continuously and the result is an overwhelming selection of devices and device platforms.

While this is a good thing for consumers, it creates a large problem for application developers who need to ensure that their application runs properly on as many devices as possible. Thus, developers must test their application across various devices on as many platforms as possible in order to ensure proper function. Due to of the large variety of devices and platforms, it is prohibitively expensive for a developer to purchase working examples of every possible combination. Thus, a need exists for a cost effective way to test mobile applications across as many devices as possible.

BRIEF SUMMARY

In summary, one aspect of the invention provides a method of managing crowdsourced devices for application testing, said method comprising: utilizing at least one processor to execute computer code that performs the steps of: receiving, from a mobile device, a request to register itself as a rentable device; receiving, from a remote device, a request to test an application; transmitting, to the remote device, a list of rentable devices available; receiving a selection, from the remote device, of at least one rentable device for testing; and responsive to receiving the selection, transmitting instructions to the at least one rentable device to execute the instructions, the instructions comprising at least one test step for an application.

Another aspect of the invention provides an apparatus for managing crowdsourced devices for application testing, said computer program product comprising: at least one processor; and a computer readable storage medium having computer readable program code embodied therewith and executable by the at least one processor, the computer readable program code comprising: computer readable program code that receives, from a mobile device, a request to register itself as a rentable device; computer readable program code that receives, from a remote device, a request to test an application; computer readable program code that transmits, to the remote device, a list of rentable devices available; computer readable program code that receives a selection, from the remote device, of at least one rentable device for testing; and computer readable program code that responsive to receiving the selection, transmits instructions to the at least one rentable device to execute the instructions, the instructions comprising at least one test step for an application.

An additional aspect of the invention provides a computer program product for managing crowdsourced devices for application testing, said computer program product comprising: a computer readable storage medium having computer readable program code embodied therewith, the computer readable program code comprising: computer readable program code that receives, from a mobile device, a request to register itself as a rentable device; computer readable program code that receives, from a remote device, a request to test an application; computer readable program code that transmits, to the remote device, a list of rentable devices available; computer readable program code that receives a selection, from the remote device, of at least one rentable device for testing; and computer readable program code that responsive to receiving the selection, transmits instructions to the at least one rentable device to execute the instructions, the instructions comprising at least one test step for an application.

A further aspect of the invention provides a method comprising: receiving, from a mobile device, a request to register itself as a rentable device; receiving, from a remote device, a request to test an application; transmitting, to the remote device, a list of rentable devices available; receiving a selection, from the remote device, of at least one rentable device for testing; receiving, from the remote device, an application for testing; scanning, using a processor, the application for testing; identifying, based on the scanning, at least one test step requiring access to personal information; and responsive to identifying the at least one test step, transmitting instructions to the at least one rentable device to execute, the instructions comprising: instructions to execute: at least one test step for an application in at least one of: guest mode and dummy mode.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
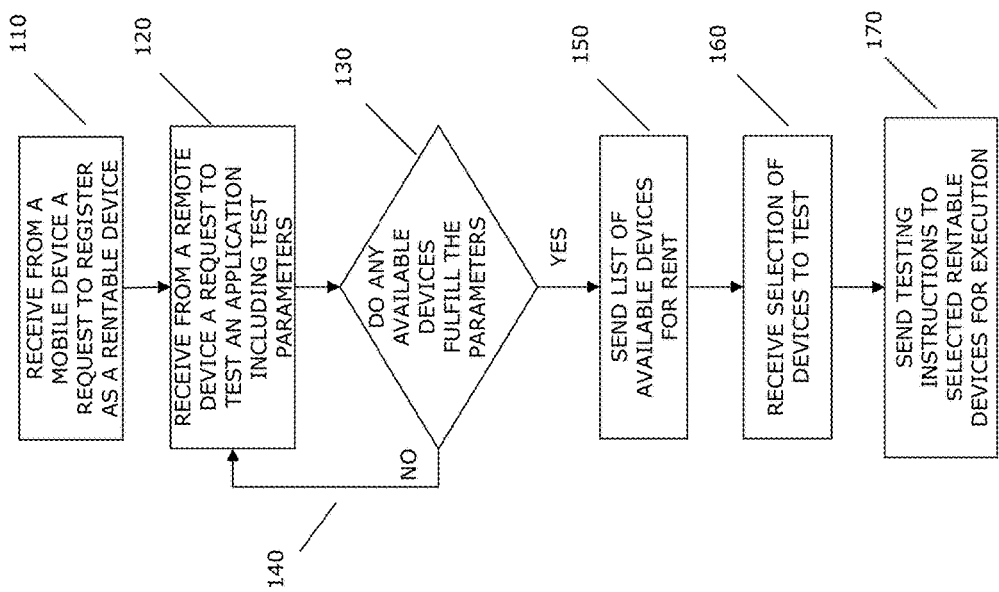
FIG. 1 illustrates an example method of a crowdsourced device cloud for application testing.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

Developing or supporting an existing application or service is a constant challenge for developers. In addition to testing applications on the vast number of devices, applications need to be tested at different geographic locations and using varying network providers. Currently, one of the most used testing methods requires an application developer to procure as many mobile devices as possible. Alternatively, services exist which have themselves procured a large variety of devices and may allow developers to batch test their devices for a fee. However, procuring new devices is still challenging even for the companies offering this service; thus many devices go untested.

Regardless of this difficulty, consumers expect applications to work seamlessly on all mobile devices of different form factors and operating systems (OS). Thus, thorough testing of mobile applications is typically a requirement before launching a large scale application. Currently, hundreds of variants of mobile devices are available on the market, and it can be an enormous challenge for current application systems to accommodate all variants. In an ideal world, real time context of mobile testing would be used with multiple environments to test applications. This process would also need to involve simulating real world conditions, which is extremely difficult on current aggregate device systems (e.g., wherein all of the devices are housed in a central testing facility).

Another factor, not typically considered, is the use of devices in different geographical locations and on different mobile networks by different end users. As the poorer regions of the world begin to catch up technologically, the number users in previously untested locations is going to explode. Thus, a solution is needed that can utilize actual user devices already experiencing this typical daily activity in a wide variety of geographic locations. However, this scenario creates an additional problem of how to utilize end user devices for testing purposes while also keeping user privacy and sensitive data safe.

Therefore, an embodiment allows an end user (e.g., typical consumer) to offer their mobile device to be part of a device test could. Thus, when a user is not actively using their device, they can activate (e.g., manually or automatically) a device sharing application that allows for remote testing of applications on their device. The test cloud allows for a privacy preserving automated or manual testing of various mobile applications. In turn, the end users receive payment which correlates with mobile context and degree of support being offered to the device cloud.

A further embodiment comprises a centralized server that receives from a mobile device (e.g., end user device) a request to register as a rentable device. The request may include various factors which detail the rights granted to the test cloud. The embodiment (i.e., centralized server) may then receive a request from a remote device (e.g., laptop, PC, etc.) requesting to test a particular application. The request can include specific requirements (e.g., location, device type, environmental factor, etc.). If the device type is available, an embodiment transmits, to the remote device, a list of available rentable devices that match the required criteria. The remote device may then make a selection of the available rentable devices for testing. Based on that selection, an embodiment sends specific instructions to each selected mobile device to execute (e.g., installing a particular application and executing a particular step or set of steps within the application).

The description now turns to the figures. The illustrated embodiments of the invention will be best understood by reference to the figures. The following description is intended only by way of example and simply illustrates certain selected exemplary embodiments of the invention as claimed herein.

Specific reference will now be made here below to the figures. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 5. In accordance with an exemplary embodiment, most if not all of the process steps, components and outputs discussed with respect to FIG. 1 can be performed or utilized by way of a processing unit or units and system memory such as those indicated, respectively, at 16' and 28' in FIG. 5, whether on a server computer, a client computer, a node computer in a distributed network, or any combination thereof.

Broadly contemplated herein, in accordance with at least one embodiment of the invention are methods and arrangements which involve registering end user devices and leveraging those devices as virtual devices in a device test cloud for manual or automated testing of mobile applications. An embodiment may collect and manage the mobile context information of many registered active devices enabling the collection of rich device profiles with numerous real-time contexts for testing. A further embodiment may identify explicitly or implicitly inactive periods of a mobile device and the context within which the mobile device is operating. An embodiment may then provide incentive and/or payment to an end user based on the offered context of their mobile device. For example, if they possess a rare device or rare environmental circumstances the payment/incentive may increase.

Referring now to FIG. 1, an embodiment may receive from a mobile device (e.g., cellphone, smartphone, tablet, etc.) a request to register itself as a rentable device at 110. When an end user (e.g., a mobile device owner) wishes to register their device to be enrolled in the rental program, an embodiment may provide them with a specific application (e.g., a crowd device cloud mobile application or crowd-source app). Through the provided application, the end user may volunteer their device for rent at their convenience. This allows the device owner to set the specifics and conditions under which the device can be used by modifying user settings within the crowd-source app. For example, a user may create a subscription list which contains a whitelist of applications that are approved for installation and testing. Alternatively, an embodiment may allow for a blacklist, thus allowing a user to create a list of applications they do not wish to be installed and tested on their device.

In a further embodiment, the crowd-source app (i.e., the crowd device cloud mobile application) allows a user to sign up and create an account to which they can associate one or multiple mobile devices to rent. Once a user has associated a particular device with their account, an embodiment monitors all of the mobile sensors of the device (e.g., using the crowd-source app) in order to verify the mobile context (e.g., device type, OS type/version, movement, location, status, etc.) of the device. Using this context, an embodiment may determine various factors of the device which may relate directly to the usefulness of the device in testing as discussed herein.

An embodiment may also offer a user particular incentives based on the various factors. For example, the rental program may offer incentives to the device owner along with an actual per minute billing plan. The incentives may follow a dynamic pricing model based on supply and demand, or additional contextual situations of the device itself. In one embodiment, the amount may get calculated based on a per unit session (e.g., a minimum of 15 minutes) basis with a variety of available rent incentives depending upon the device model. For example, there may be a slight difference between the rental prices of more expensive devices versus cheaper devices. Similarly, there may be a price difference for high and low end hardware configurations, on devices which offer multiple configurations.

A further embodiment may offer surcharges or incentives as a method to increase the involvement of mobile device owners in the rental program. The incentives may be automatically adjusted based on the supply of devices with similar settings or context. Some examples of when a user may be entitled to receive incentives may be when a device has "rare context" or is in "high demand." In the case of rare context, a device is in some context that is considered rare by a system intelligence within an embodiment. This may be based off of an algorithm, or weighted based on the real time availability of other devices. For example, a device may be considered in a rare context if the device owner is driving a car at a very high speed while the device is in the car and unused. In this example, the context of high speed and its effect on the global positioning system (GPS) can be considered as a rare context.

Additionally or alternatively, high demand incentives may be available if a particular device or set of devices is in high demand by remote users (e.g., a new device hit the market and has not been widely adopted yet). Thus, if a user has a device that is currently in high demand, there can be additional incentives allotted for rental time. An additional example may be if there are very few available devices in a particular geographic location, and the demand is particularly high for the context associated with that geographic location, the device may then be labeled as high demand, thus helping to fuel participation and satisfy the demand.

An embodiment may then receive a request from a remote device (e.g., laptop, desktop, console, etc.) to test a particular application at 120. For example, a remote user that desires to test a specific application or multiple applications may register with an embodiment and logon to a portal or equivalent account authentication system. Once logged in and associated with that particular account, the remote user can specify particular parameters or conditions required for the requested devices to be tested.

Once multiple individuals and multiple devices are registered to an embodiment, a device library may be created. The device library may contain a current and updated list of all mobile devices and their current status (e.g., available for rent, unavailable for rent, contextual factors, etc.). An embodiment then, based on the parameters input at 120, evaluates the device library to determine if there are any available devices that meet the requirements selected by the remote user at 130. If no devices are available that meet the parameters requested from the remote user, an embodiment may notify the remote user and offer an opportunity to modify the search criteria at 140 and reevaluate at 130.

An embodiment may update the device library in real-time or at predetermined intervals. For example, the crowd device cloud application, discussed herein, installed on the mobile device will check the user configuration on the device for various factors (e.g., changes in the user rent policy, updates in OS type or version, mobility of the device, network connectivity of the device such as Wi-Fi or 3G, etc.). If at any time, a mobile device changes status and complies with a previously requested set of parameters from a remote user, an embodiment may transmit a notification (e.g., email, text, popup, etc.) to the remote device to inform the user of the new availability. Additionally, regardless of remote user request, the device library is updated based on status changes and those changes are reflected in the view presented to the remote use upon logging into the central server. Thus, an embodiment may offer a web or application interface which helps a remote user login in to their account and interact with the crowd device cloud infrastructure. This interface may also provide specific rent information details associated with available devices within the remote user's dashboard (e.g., rare context, high demand, OS version, sensor details, etc.).

In a further embodiment, when determining if any available devices fulfill the requested parameters, a set of mandatory parameters (e.g., security settings) may be utilized. Mandatory parameters may be implemented to ensure a desired level of quality control or security. For example, it may be required that a device's battery level meets or exceeds a particular threshold percentage or amount. Additionally, an embodiment may require that no user action is detected for a threshold time (e.g., twenty minutes), thus reducing the likelihood of test interruption. Moreover, as discussed herein, additional limitations may be put in place by the owner of the mobile device, further limiting the availability of a device for security reasons.

In a further embodiment, a cloud server maintains all of the device owner's and remote user's accounts and their respective sessions. An embodiment may additionally maintain the available device pools (e.g., available and unavailable rental devices). Moreover, based on the continuous monitoring, an embodiment may prepare session reports and generate rent invoice and incentives calculations. Additionally, an embodiment may maintain device connections and all device requests.

Figure 2:
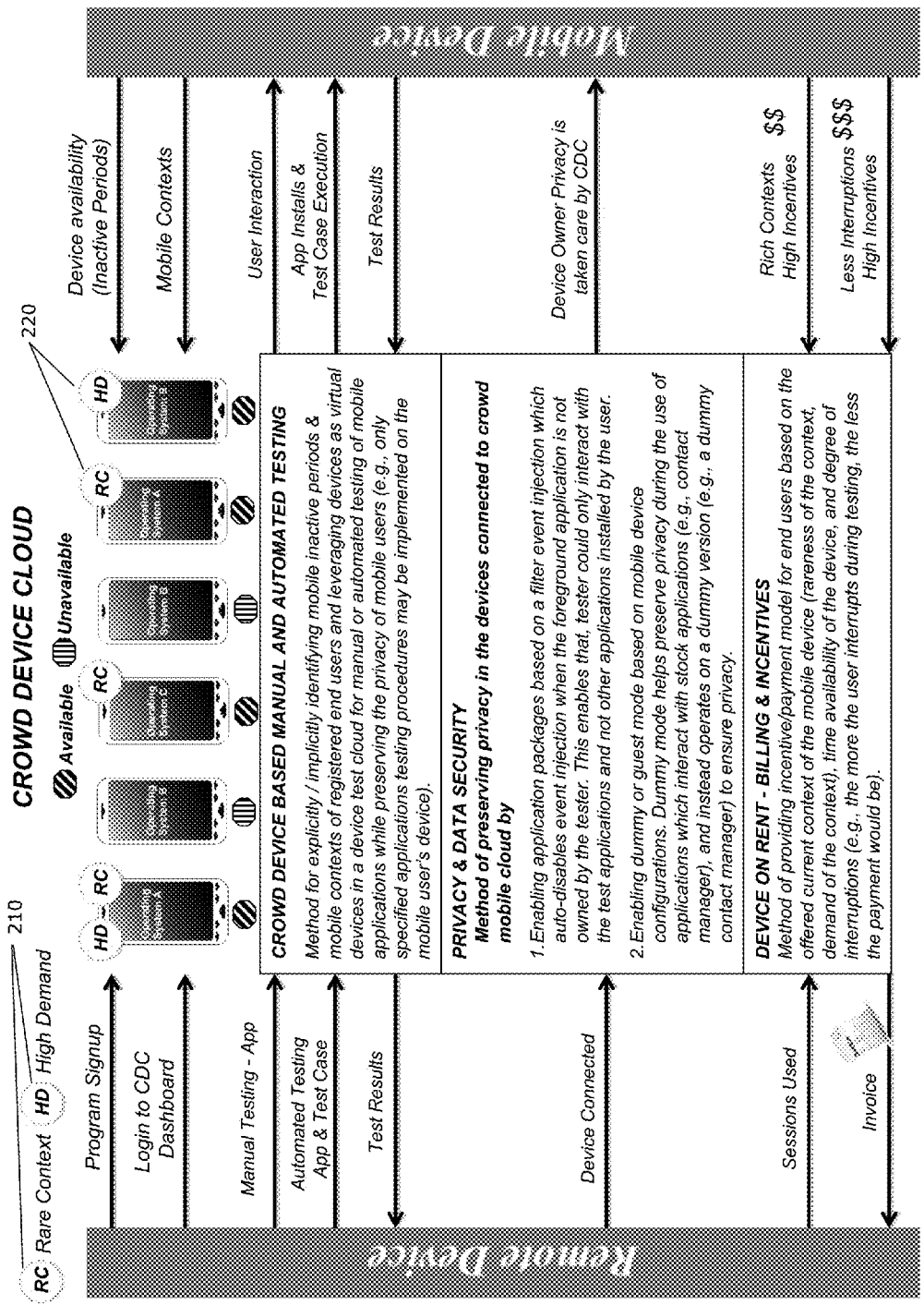
FIG. 2 illustrates an example embodiment of a crowdsourced device cloud for application testing.

Once all available devices are determined at 130, a list of available devices is then transmitted to the remote user (e.g., via a web portal). The list of available devices may include information such as a total billing amount (e.g., the regular bill amount in addition to any surcharges caused by incentives such as a rare context or high demand). Devices that require a surcharge may be marked with an identifying characteristic (e.g., "Rare Context (RC)", "High Demand (HD)", etc.) such as that shown in FIG. 2 at 210. If an embodiment tags a device's context information as rare context, the RC tag may be affixed to a visual representation of the device (e.g., 220). Thus, for example, the rareness of the context, demand of the context, time availability of the device, and degree of interruptions (e.g., quantity of user interruption during testing) may all factor into the total payment calculation shown to the remote user. After an embodiment transmits the potential device list, the remote user makes a selection from the available devices at 160.

An embodiment may then send specific testing instructions to the selected devices at 170. These testing instructions may be executed manually or automatically. Thus, in one embodiment, the testing may be automatically carried out. For example, once a remote user has selected the devices to test at 160, a test script (e.g., a set of instructions that are to be performed on the system) is received from the remote user and passed to the rentable device (e.g., a mobile device) for testing purposes. The rentable device then executes the test script in the desired sequence a predetermined number of times (e.g., one (1) cycle, ninety (90) cycles, etc.). Additionally or alternatively, an embodiment may execute the test manually. For example, an embodiment may allow the remote device to transmit a single command or multiple commands to the rentable device, thereby controlling the actions of the rentable device remotely (e.g., a remote streaming application).

Figure 3:
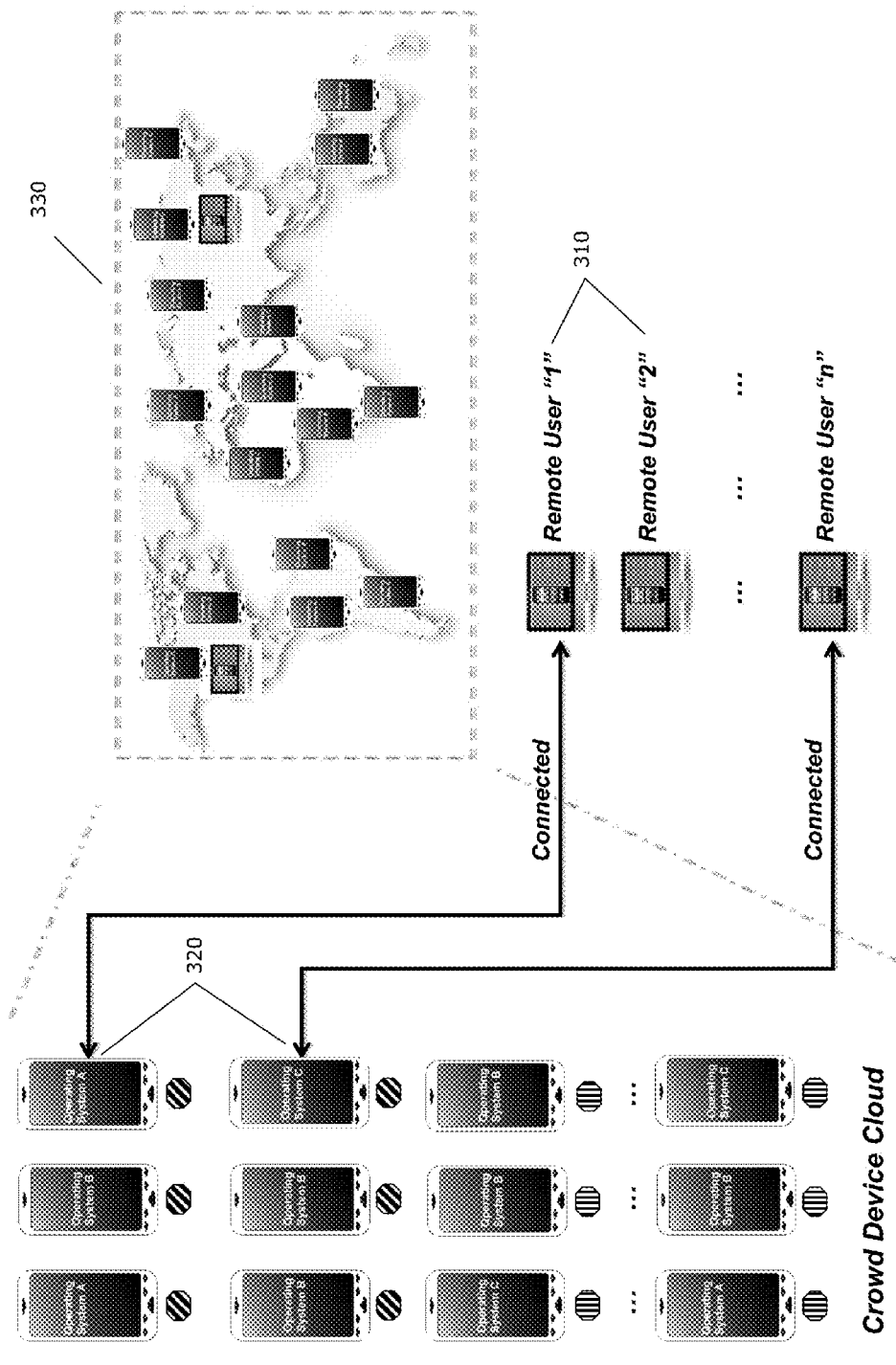
FIG. 3 illustrates another example embodiment of a crowdsourced device cloud for application testing.
Figure 4:
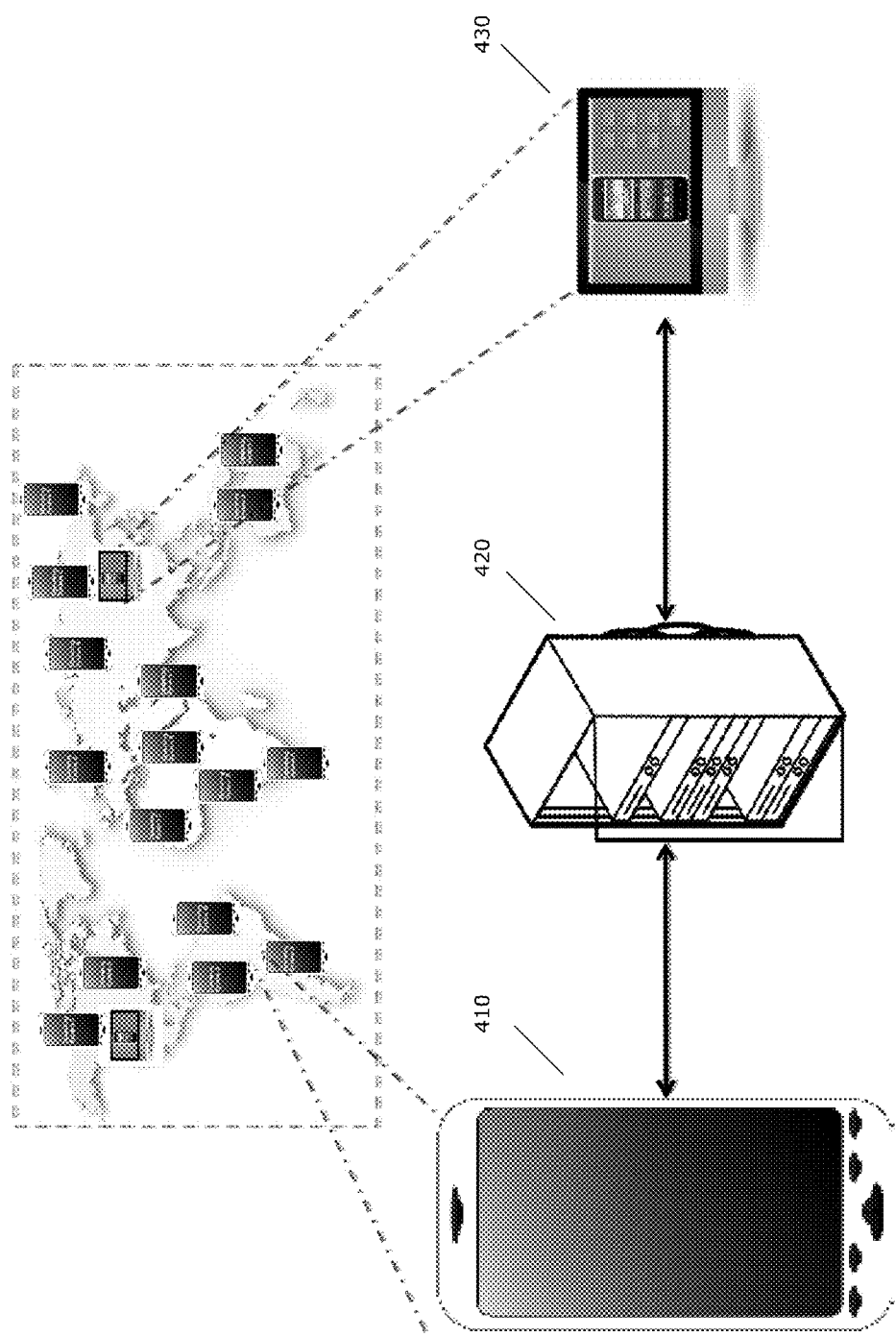
FIG. 4 illustrates another example embodiment of a crowdsourced device cloud for application testing.

Referring briefly to FIG. 3, an example is shown where multiple remote users at 310 are connected to various pools of available mobile devices at 320. The mobile devices can be associated with various geographic locations as shown at 330. Now referring briefly to FIG. 4, an example embodiment is illustrated showing a mobile device at 410, the crowd device cloud at 420, and a remote device at 430 interconnected.

An embodiment also preserves the privacy of end-users (e.g., only certain testing related activities can be carried out for various applications). For example, an end user's device(s) may be controlled by a third party tester completely or not at all for certain functions. For example, when a remote user uploads an application to have it tested, an embodiment processes the application via an application scan, which may log all user permissions required by the application intended to be tested. Generic device data access permissions, for example, location access, network access, etc. are allowed to progress through the application scan. However, requests to access private data (e.g., a contact list, photo gallery, email application, text history, etc.) gets processed in a more secure manner.

In one embodiment, a "Guest Mode" is activated. An embodiment may first enable guest mode on the mobile device (e.g., through the crowd device cloud application discussed herein) and then install the application within the bounds of guest mode. Guest mode is an operating system (OS) feature which may suppress or hide private information. Additionally or alternatively, an embodiment may place the mobile device in a "Dummy Mode." An embodiment may be required to use dummy mode if a mobile device OS is found to be incompatible with a guest mode. Applications that are run while in dummy mode receive interruptions by the crowd device cloud application when attempting to access private data. The cloud app then opens a dummy application (e.g., a dummy contact list) in place of the user's actual personal application.

Once the application scan process is complete, an embodiment may add the scanned application into a subscription list available to the remote user for subsequent testing purposes. A further embodiment may then replicate all remote user subscriptions when an available mobile device connects to a remote device. Additionally or alternatively, the subscription list may contain application tags (e.g., description information, execution count, etc.). These tags may be automatically generated based on factors learned over time by an embodiment, or they may be created manually by a remote user.

As a further security measure, an embodiment may monitor every action regarding an application launch performed by a remote user on a connected mobile device (e.g., rented device). For example, an embodiment may verify that the application requesting to be launched by a remote user belongs to their subscription list; however, if the application is not in the subscription list (i.e., the application scan has not been performed), an embodiment suspends all remote user action to prevent execution of that particular application. Thus, a remote user may only perform actions on the applications from their personal subscription list.

Figure 5:
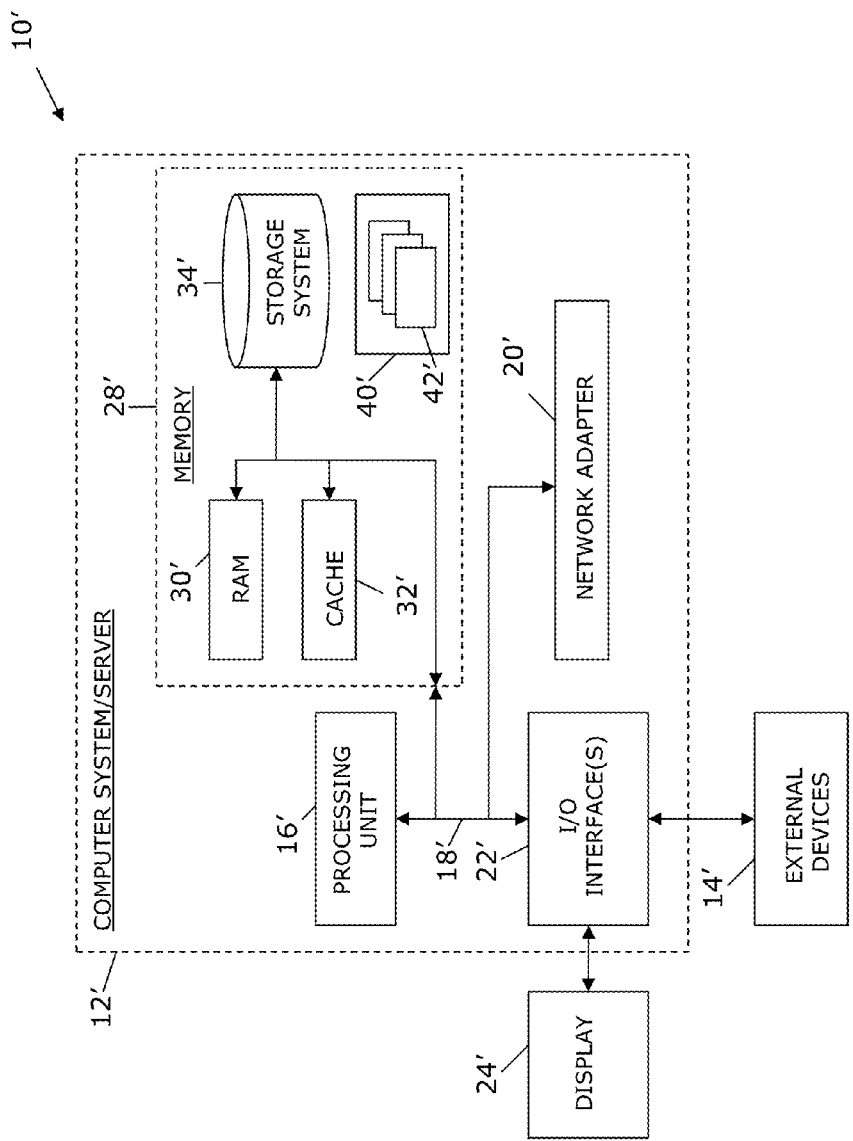
FIG. 5 illustrates an example computer system.

Referring now to FIG. 5, a schematic of an example of a computing node is shown. Computing node 10' is only one example of a suitable computing node and is not intended to suggest any limitation as to the scope of use or functionality of embodiments of the invention described herein. Regardless, computing node 10' is capable of being implemented and/or performing any of the functionality set forth hereinabove. In accordance with embodiments of the invention, computing node 10' may be part of a cloud network or could be part of another type of distributed or other network (e.g., it could represent an enterprise server), or could represent a stand-alone node.

In computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/ server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of managing crowdsourced devices for application testing, said method comprising:
   utilizing at least one processor to execute computer code that performs the steps of:
   receiving, from a mobile device, a request to register itself as a rentable device;
   receiving, from a remote device, a request to test an application, wherein the request comprises an identification of parameters of the rentable device;
   transmitting, to the remote device, a list of available rentable devices meeting the requested parameters;
   receiving a selection, from the remote device, of at least one rentable device for testing; and
   responsive to receiving the selection, transmitting instructions to the at least one rentable device to execute the instructions, the instructions comprising at least one test step for an application and wherein the instructions are executed and performed automatically without user intervention.

2. The method according to claim 1, wherein the instructions are executed in a manner selected from the group consisting of: automatic testing and manual testing;
   wherein the automatic testing comprises: receiving a test script from the remote device; and transmitting the test script to the rentable device for execution; and
   wherein the manual testing comprises: receiving a single test step from the remote device; and transmitting the single test step to the rentable device for execution.

3. The method according to claim 1, wherein the transmitting a list of rentable devices is based on at least one parameter, received from the remote device, required for testing.

4. The method according to claim 3, further comprising, transmitting, to the remote device, a notification when a new rentable device becomes available based on the at least one parameter.

5. The method according to claim 1, wherein the transmitting a list of rentable devices comprises transmitting device context associated with each rentable device.

6. The method according to claim 1, further comprising:
   receiving a payment, based on the instructions executed on the at least one rentable device, from a remote device; and
   transmitting a payment, based on the instructions executed on the at least one rentable device, to a mobile device.

7. The method according to claim 6, wherein the payment may include incentives, wherein the incentives are based on at least one of: device context, device demand, and degree of interruption.

8. The method according to claim 1, further comprising:
   creating a security profile for the mobile device prior to registering the mobile device as a rentable device;
   wherein the security profile is at least one of: user customizable and mandatory.

9. The method according to claim 1, further comprising:
   receiving, from the remote device, an application for testing;
   scanning, using a processor, the application for testing;
   identifying, based on the scanning, at least one test step requiring access to personal information; and
   responsive to identifying the at least one test step, transmitting instructions to the at least one rentable device to execute the instructions, the instructions comprising executing the identified at least one step in at least one of: guest mode and dummy mode.

10. An apparatus for managing crowdsourced devices for application testing, said computer program product comprising:
    at least one processor; and
    a computer readable storage medium having computer readable program code embodied therewith and executable by the at least one processor, the computer readable program code comprising:
  computer readable program code that receives, from a mobile device, a request to register itself as a rentable device;
  computer readable program code that receives, from a remote device, a request to test an application, wherein the request comprises an identification of parameters of the rentable device;
  computer readable program code that transmits, to the remote device, a list of available rentable devices meeting the requested parameters;
  computer readable program code that receives a selection, from the remote device, of at least one rentable device for testing; and
  computer readable program code that responsive to receiving the selection, transmits instructions to the at least one rentable device to execute the instructions, the instructions comprising at least one test step for an application and wherein the instructions are executed and performed automatically without user intervention.

11. A computer program product for managing crowd-sourced devices for application testing, said computer program product comprising:
  a computer readable storage medium having computer readable program code embodied therewith, the computer readable program code comprising:
  computer readable program code that receives, from a mobile device, a request to register itself as a rentable device;
  computer readable program code that receives, from a remote device, a request to test an application, wherein the request comprises an identification of parameters of the rentable device;
  computer readable program code that transmits, to the remote device, a list of available rentable devices meeting the requested parameters;
  computer readable program code that receives a selection, from the remote device, of at least one rentable device for testing; and
  computer readable program code that responsive to receiving the selection, transmits instructions to the at least one rentable device to execute the instructions, the instructions comprising at least one test step for an application and wherein the instructions are executed and performed automatically without user intervention.

12. The computer program product according to claim 11, wherein the instructions are executed in a manner selected from the group consisting of: automatic testing and manual testing;
  wherein the automatic testing comprises: receiving a test script from the remote device; and transmitting the test script to the rentable device for execution; and
  wherein the manual testing comprises: receiving a single test step from the remote device; and transmitting the single test step to the rentable device for execution.

13. The computer program product according to claim 11, wherein the transmitting a list of rentable devices is based on at least one parameter, received from the remote device, required for testing.

14. The computer program product according to claim 13, wherein the computer readable program code further comprises:
  computer readable program code that transmits, to the remote device, a notification when a new rentable device becomes available based on the at least one parameter.

15. The computer program product according to claim 11, wherein the transmitting a list of rentable devices comprises transmitting device context associated with each rentable device.

16. The computer program product according to claim 11, wherein the computer readable program code further comprises:
  computer readable program code that receives a payment, based on the instructions executed on the at least one rentable device, from a remote device; and
  computer readable program code that transmits a payment, based on the instructions executed on the at least one rentable device, to a mobile device.

17. The computer program product according to claim 15, wherein the payment may include incentives, wherein the incentives are based on at least one of: device context, device demand, and degree of interruption.

18. The computer program product according to claim 11, wherein the computer readable program code further comprises:
  computer readable program code that creates a security profile for the mobile device prior to registering the mobile device as a rentable device;
  wherein the security profile is at least one of: user customizable and mandatory.

19. The computer program product according to claim 11, wherein the computer readable program code further comprises:
  computer readable program code that receives, from the remote device, an application for testing;
  computer readable program code that scans, using a processor, the application for testing;
  computer readable program code that identifies, based on the scanning, at least one test step requiring access to personal information; and
  computer readable program code that responsive to identifying the at least one test step, transmits instructions to the at least one rentable device to execute the instructions, the instructions comprising executing the identified at least one step in at least one of: guest mode and dummy mode.

20. A method comprising:
  receiving, from a mobile device, a request to register itself as a rentable device;
  receiving, from a remote device, a request to test an application, wherein the request comprises an identification of parameters of the rentable device;
  transmitting, to the remote device, a list of available rentable devices meeting the requested parameters;
  receiving a selection, from the remote device, of at least one rentable device for testing;
  receiving, from the remote device, an application for testing;
  scanning, using a processor, the application for testing;
  identifying, based on the scanning, at least one test step requiring access to personal information; and
  responsive to identifying the at least one test step, transmitting instructions to the at least one rentable device to execute and wherein the instructions are executed and performed automatically without user intervention, the instructions comprising:
  instructions to execute: at least one test step for an application in at least one of: guest mode and dummy mode.

* * * * *